United States Patent [19]

Manning

[11] 4,430,569

[45] Feb. 7, 1984

[54] POCKET RADIATION DOSIMETER--DOSIMETER CHARGER ASSEMBLY

[75] Inventor: Frank W. Manning, Norris, Tenn.

[73] Assignee: The United States of America as represented by the United States Department of Energy, Washington, D.C.

[21] Appl. No.: 358,960

[22] Filed: Mar. 17, 1982

[51] Int. Cl.³ .............................................. G01T 1/18
[52] U.S. Cl. ................................................. 250/377
[58] Field of Search ........................ 250/376, 377, 378

[56] References Cited

U.S. PATENT DOCUMENTS

| | | |
|---|---|---|
| 2,741,707 | 4/1956 | Futterknecht ...................... 250/377 |
| 2,761,073 | 6/1956 | Carlbom et al. . | |
| 3,017,511 | 1/1962 | Landsverk et al. ................. 250/377 |
| 4,247,775 | 1/1981 | Kronenberg ........................ 250/377 |

OTHER PUBLICATIONS

*Repair and Maintenance Manual for Civil Defense,* vol. 4, "Dosimeters and Charges", Office of Civl Defense, Washington, D.C.
*Health Physics Instrument Manual,* ORNL Report 332, Aug. 1978.
Section 23, CDV-750-5-5B, Bendix Corporation Dosimeter Charger Specifications.

*Primary Examiner*—Janice A. Howell
*Attorney, Agent, or Firm*—Fred O. Lewis; Stephen D. Hamel

[57] ABSTRACT

This invention is a novel pocket-type radiation dosimeter comprising an electrometric radiation dosimeter and a charging circuit therefor. The instrument is especially designed to be amenable to mass production, to have a long shelf life, and to be compact, lightweight, and usable by the layman. The dosimeter proper may be of conventional design. The charging circuit includes a shake-type electrostatic generator, a voltage doubler for integrating generator output voltages of one polarity, and a switch operated by an external permanent magnet.

11 Claims, 1 Drawing Figure

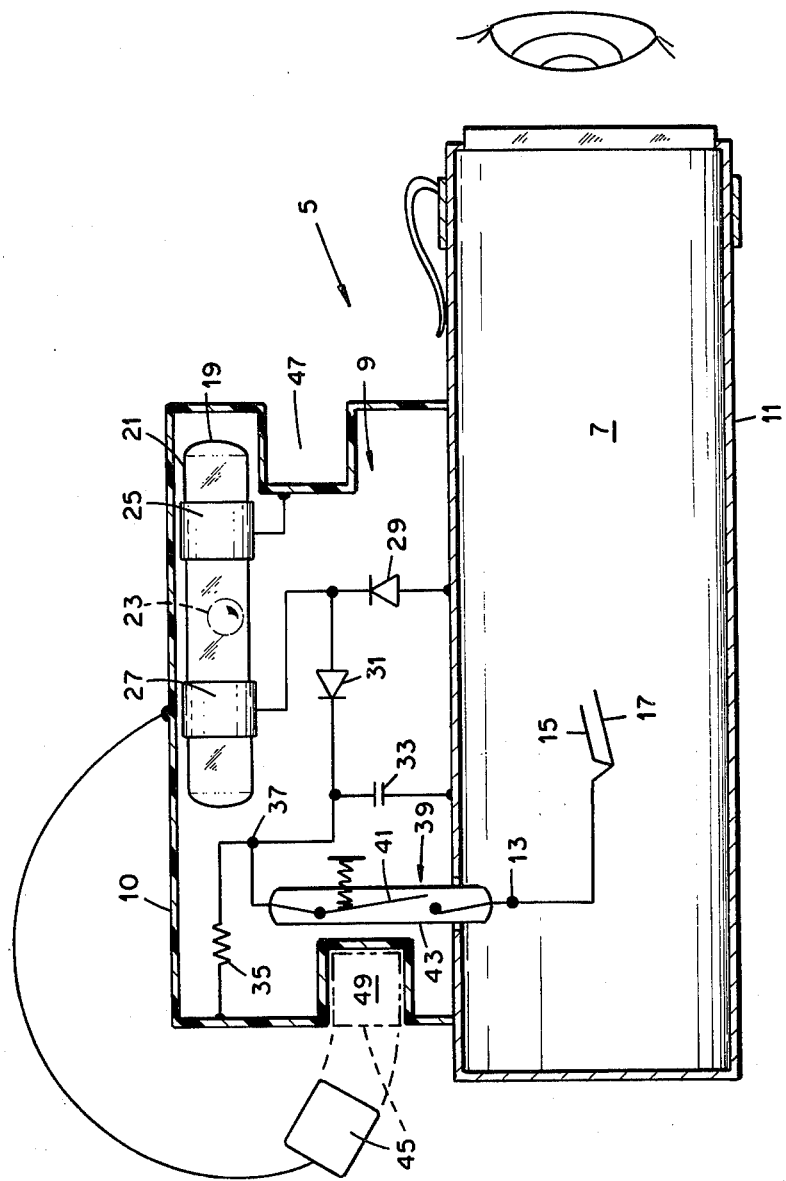

POCKET RADIATION DOSIMETER--DOSIMETER CHARGER ASSEMBLY

The invention was made as a result of a contract with the United States Department of Energy.

BACKGROUND OF THE INVENTION

This invention relates broadly to portable assemblies comprising an electrometric radiation dosimeter and a charger therefor. More particularly, it relates to such assemblies including a battery-free charger.

As is well known, electrometer-type dosimeters require charging to selected degree before use and recharging after extended storage or exposure to radiation. There is a continuing need for a manually operated, portable dosimeter charger which is reliable, rugged, and relatively inexpensive. U.S. Pat. No. 4,247,775, which issued to S. Kronenberg on Jan. 27, 1981, discloses a dosimeter charger in which a charging voltage is produced by manually generating a force which is applied to a piezoelectric crystal. U.S. Pat. No. 2,761,063, issued to L. E. Carlbom et al on Aug. 28, 1956, discloses a radiation dosimeter provided with an integral charger which generates electrical charges when shaken. Co-pending, co-assigned U.S. patent application Ser. No. 343,607 discloses a pocket radiation dosimeter and a non-electrostatic charger therefor. The structure and operation of electrometer-type dosimeters and battery-operated chargers therefor are described in various publications, such as the following: Repair and Maintenance Manual for Civil Defense Radiological Instruments, Vol. 4, Office of Civil Defense, Washington, D.C. The foregoing publications are incorporated herein by reference.

In some dosimeter applications, it is important that the dosimeter-charging operation be made as simple and reliable as possible. Conventional shake-type electrostatic chargers are deficient in these respects because they generate voltage outputs of variable polarity, with the result that initial zeroing of the dosimeter is somewhat difficult and time-consuming. That is, one shake of the generator may drive the image upscale whereas the next may drive it downscale.

SUMMARY OF THE INVENTION

It is an object of the invention to provide a novel assembly comprising an electrometric radiation dosimeter and a charger therefor.

It is another object to provide a dosimeter-and-charger assembly which is simple to operate, easily manufactured, relatively inexpensive, and characterized by a long shelf life.

It is another object to provide a novel charging circuit for a radiation dosimeter.

Other objects and advantages will be made evident hereinafter.

BRIEF DESCRIPTION OF THE DRAWING

The single FIGURE is a schematic diagram of an assembly designed in accordance with the invention and comprising a radiation dosimeter and a charger for the dosimeter.

DETAILED DESCRIPTION OF THE INVENTION

Referring to the drawing, the invention is illustrated in terms of a compact, portable, sealed assembly 5 including a conventional radiation dosimeter 7 and a charging circuit 9 therefor. In the illustrative arrangement, the charging circuit is mounted in a sealed current-conducting housing 10. The dosimeter 7 may, for example, be Dosimeter Model CD V-730, manufactured by Bendix Corporation.

The drawing depicts a 200 milliroentgen, pocket-size dosimeter having a pair of charging contacts—i.e., an electrically conductive barrel 11 and a terminal 13. The terminal is connected to a conductive anvil 15. The anvil supports a quartz fiber 17, which is displaced proportionally from the anvil when voltage is applied to the aforementioned contacts.

The charging circuit 9 includes a generator 19 which in the illustrated embodiment includes a sealed glass or plastic tube 21 containing a mobile current-conducting material 23. The material may, for example, be in the form of a metal ball, a body of conductive liquid, or metal shot. Shaking the assembly 5 causes movement of the material 23 along the inner face of the tube, generating electrostatic charges in the wall of the tube.

As shown, spaced-apart electrodes 25 and 27 are mounted adjacent the outer wall of the tube 21 to serve as capacitive voltage pick-ups. That is, the charges which are generated in the tube wall by shaking, produce induced charges, or voltage pulses, in the electrodes. As shown, the electrodes may be metal bands extending about the tube. One of the electrodes is grounded to the housing 10.

Connected across the electrodes is a diode 29, which is connected in series-conducting relation with another diode 31. The two diodes are bridged by a capacitor 33, which is shunted by a resistor 35. The capacitor and resistor have a common terminal 37. A switch 39 is connected between terminal 37 and the anvil-and-fiber assembly 15,17. In this embodiment, the switch includes a magnetic reed 41, which is biased to open position and is sealed in a dielectric case 43. As shown, the switch case extends within the dosimeter barrel 11 and serves as a high-voltage lead-through insulator.

A permanent magnet 45 is tethered to the outside of housing 10 and normally is stored in a recess 47 therein. The magnet is insertable in a second recess 49, whose bottom wall extends alongside the switch 39.

In a typical dosimeter-charging operation, the operator shakes the assembly 5 a few times to generate voltages on the electrodes 25 and 27. The circuit 9 functions as a cascade voltage doubler (peak-to-peak voltage integrator), the input capacitances for the circuit being the capacitances between either electrode and generator 19. The diodes 29 and 31 permit voltages of only one polarity (i.e., voltages of like polarity) to be integrated by the capacitor 33, thus avoiding the variable-polarity problem discussed above (see "Background"). After shaking the assembly, the operator inserts the magnet 45 in recess 49, closing the switch 39. He then views the position of the fiber image (hairline) on the dosimeter scale. The hairline gradually moves downscale, since the charge on the capacitor 33 leaks off at a preselected rate through resistor 35. When the hairline coincides with zero on the scale, the operator opens the switch 39 by removing the magnet 34 from recess 49. The dosimeter now is ready for use.

The above-described dosimeter-and-charger assembly can be produced by mass-production techniques and can be operated by unskilled persons. The assembly avoids the use of batteries or piezoelectric crystals, as well as mechanical arrangements for applying compression or mechanical shock to such crystals. The charging circuit 9 can be made highly compact, is lightweight, and, being external of the dosimeter, does not complicate fabrication of the dosimeter. The switching arrangement permits the assembly to be completely sealed and thus promotes long shelf life. In addition, a separate leadthrough insulator is not required.

The foregoing description of the invention has been presented for the purposes of explanation and illustration. In the light of the foregoing teaching, various modifications and substitutions will be obvious to those versed in the art. It is intended that the scope of the invention be defined by the appended claims.

What is claimed is:

1. An electrometric system comprising:
   (a) an electrometric radiation dosimeter having a pair of charging contacts, and
   (b) a dosimeter-charging circuit, said circuit including:
   (1) an electrostatic charge generator including a wall of dielectric material, a mobile and electrically conductive body in contact with a face of said wall, and means confining said body for movement along said face while in contact therewith for generating electrical charges on said wall,
   (2) a cascade voltage-doubler circuit capacitively coupled to said generator to integrate generator voltage pulses of like polarity and thus provide an integrated-voltage output, and
   (3) switch means for selectively impressing said output across said contacts of said dosimeter.

2. The system of claim 1 wherein said voltage-doubler circuit is coupled to said generator via spaced-apart electrodes mounted adjacent to the opposite face of said wall to develop induced electrical charges in said electrodes.

3. The system of claim 1 wherein said voltage-doubler circuit includes a resistor-shunted capacitor for integrating said pulses.

4. An electrometric system comprising:
   (a) an electrometric radiation dosimeter having a pair of charging contacts, and
   (b) a charging circuit for said dosimeter, including:
   (1) an electrostatic charge generator including a wall of dielectric material, a mobile and electrically conductive body in contact with a face of said wall, and means confining said body for movement along said face while in contact therewith for generating electrical charges on said wall,
   (2) a pair of spaced-apart electrodes mounted adjacent the opposite face of said wall for developing induced electrical charges in said electrodes,
   (3) a series-conducting combination of first and second diodes, one of said diodes being connected across said electrodes,
   (4) voltage-integrating means connected across said combination for developing an integrated voltage output, and
   (5) switch means for selectively impressing said output across said contacts.

5. The system of claim 4 further including resistor means connected across said capacitor for discharging the same at a selected rate.

6. The system of claim 4 wherein said switch means is biased to open position.

7. The system of claim 4 wherein said switch means is a reed switch including a dielectric casing and a magnetic reed.

8. The system of claim 6 including movable permanent magnet means for effecting closing of said switch.

9. An electrometric system comprising:
   (a) an electrometric radiation dosimeter having a pair of charging contacts,
   (b) a sealed housing carried thereby,
   (c) a dosimeter-charging circuit in said housing, said circuit including:
   (1) an electrostatic charge generator including a wall of dielectric material, a mobile and electrically conductive body in contact with a face of said wall, and means confining said body for movement along said face while in contact therewith for generating electrical charges on said wall,
   (2) a pair of spaced-apart electrodes mounted adjacent the opposite face of said wall for developing induced electrically charges in said electrodes,
   (3) a series combination of first and second diodes, the anode of the first diode being connected to the cathode of the second, one of said diodes being connected across said electrodes,
   (4) voltage-integrating means comprising a resistance-shunted capacitor connected across said combination, and
   (5) switch means for selectively connecting said voltage-integrating means across said contacts.

10. The system of claim 9 wherein said switch means includes a magnetic switching element movable between a switch-closed position and a switch-open position.

11. The system of claim 9 further including permanent-magnet means carried by said housing and movable to a position where its magnetic field effects movement of said magnetic member.

* * * * *